United States Patent
Olakangil et al.

(10) Patent No.: US 11,343,189 B2
(45) Date of Patent: May 24, 2022

(54) SYSTEMS AND METHODS FOR AUGMENTING TCAM BANK PROCESSING WITH EXACT MATCH

(71) Applicant: Arista Networks, Inc., Santa Clara, CA (US)

(72) Inventors: Joseph Olakangil, San Jose, CA (US); Nitin Karkhanis, Fremont, CA (US); Anuraag Mittal, Livermore, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 147 days.

(21) Appl. No.: 16/918,569

(22) Filed: Jul. 1, 2020

(65) Prior Publication Data

US 2021/0119919 A1   Apr. 22, 2021

Related U.S. Application Data

(60) Provisional application No. 62/923,605, filed on Oct. 21, 2019.

(51) Int. Cl.
*H04L 45/745* (2022.01)
(52) U.S. Cl.
CPC .............................. *H04L 45/7457* (2013.01)
(58) Field of Classification Search
CPC .................................................. H04L 45/7457
See application file for complete search history.

(56) References Cited

U.S. PATENT DOCUMENTS

| | | | | |
|---|---|---|---|---|
| 2013/0272305 A1* | 10/2013 | Lefebvre | ............... | H04L 45/306 370/392 |
| 2014/0153443 A1* | 6/2014 | Carter | ..................... | H04L 45/54 370/256 |
| 2015/0009831 A1* | 1/2015 | Graf | ........................ | H04L 47/31 370/236 |
| 2015/0304212 A1* | 10/2015 | Zhou | ...................... | H04L 45/38 370/392 |
| 2017/0134277 A1* | 5/2017 | Bifulco | ................. | H04L 45/745 |
| 2019/0036821 A1* | 1/2019 | Levy | ................... | G06F 12/0868 |

* cited by examiner

*Primary Examiner* — Chi H Pham
*Assistant Examiner* — Weibin Huang
(74) *Attorney, Agent, or Firm* — Fountainhead Law Group P.C.

(57) ABSTRACT

Systems and methods are provided for programming a network device. A method includes receiving a wild card entry at the network device, the network device including a ternary content addressable memory (TCAM) table and an exact match (EM) table. The method determines whether the wild card entry is compatible with the EM table. In response to determining that the wild card entry is compatible with the EM table, the method determines the available space in the EM table, the usage of the TCAM table, and at least one flow characteristic of the wild card entry. The method evaluates the determined available space in the EM table, usage of the TCAM table, and the at least one flow characteristic against a set of stored rules that select the EM table or the TCAM table. The method programs the wild card entry in the EM table or TCAM table based upon the selection.

22 Claims, 7 Drawing Sheets

SYSTEMS AND METHODS FOR AUGMENTING TCAM BANK PROCESSING WITH EXACT MATCH

RELATED APPLICATIONS

Applicant claims the benefit of priority of prior, co-pending provisional application No. 62/923,605, filed Oct. 21, 2019, the entirety of which is incorporated by reference.

BACKGROUND

The present disclosure relates to network device programming, in particular to programming packet processing.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

In order to handle a high volume of traffic being routed in different ways, network controllers and switches have been adapted to implement a series of connected reprogrammable flow entry tables (including in a switch's exact match (EM) and ternary content addressable memory (TCAM) tables). A TCAM is a specialized memory with tables having multiple entries with which it compares (using internal logic) elements of network packets with TCAM table entries in parallel and/or series to identify a match with a particular action (e.g., forwarding action). They provide a benefit over traditional EM tables in that they can output multiple results based upon a comparison (match, non-match, or "don't care") and are not limited to an EM (match or non-match) result. Some network element TCAMs and tools permit processing of TCAM tables in series, allowing the processing of large numbers of entries in TCAM concurrently.

An EM table is typically arranged in standard memory (e.g., RAM). An EM table does not include its own logic, and each entry in the EM table is processed by comparing table entry values with data that results in an exact match or a non-match. Although an EM table does not provide the same level of processing flexibility and parallelism as a TCAM, an EM table generally requires fewer resources to program an equivalent number of entries.

Many network processing systems have adopted the use of "wild card" entries in network device lookup tables. Such "wild card" entries may represent partial matches where the data that the entries match with need not be exactly the same. For example, it may be desired to match source or destination network addresses from a packet against a subnet address for certain default processing and avoid the use of numerous entries for matching with every possible variation. In some cases, particular specific network addresses corresponding with the subnet address may need further processing and can be processed using separate table entries (e.g., utilizing a longest prefix match (LPM) configuration). Because of its flexibility, a TCAM is generally selected to process partial or "wild card" matches and associated actions and may permit additional processing using other entries for further processing (if applicable).

However, TCAMs occupy a large footprint on a chip and are relatively expensive. Integration of TCAMs is thus usually kept to a minimum in order to reduce the cost and size of the devices they are used in. Thus, it is desirable to make efficient use of TCAMs in order to maximize their benefits, particularly in complex networks. Normally, certain table entries are allocated to a TCAM instead of an EM table because of their priority or based on the type of parameters used (e.g., a masked parameter using a wild card table entry).

Some EM tables are structured to contain entries for matching with complete EM parameters (e.g., complete network addresses) and will not generally permit particular wild card flow table entries. Thus, a device configuration that includes numerous table entries that are not designed for an EM table may result in a TCAM that is overutilized compared to an EM table. This may also result in numerous low-priority flow table entries being allocated to a TCAM, while higher-priority entries may be pushed into the EM table because the TCAM is overutilized. Thus, more efficient allocation methods are desirable for improving the balance between the use of TCAM and EM tables in network devices.

More efficient use of TCAMs is described herein for network devices (e.g., switches, routers) that have both TCAM and EM table memory architectures. Some approaches allocate the processing of network packets to an EM table (e.g., in a traditional content addressable memory (CAM) or in static random access memory (SRAM)) when a wild card flow table entry can be adapted for using an exact match table. In some embodiments, a wild card flow table entry is identified by analyzing the entry and determining that the entry has a masked parameter (e.g., a subnet address).

After receiving a wild card flow table entry, an embodiment first determines the compatibility of the flow table entry with an EM table. Compatibility may be determined by analyzing whether the flow table entry can be converted into one or multiple EM flow table entries. For example, it is determined that a subnet address parameter of the flow table entry (not generally formatted for use in an EM table) can be processed using multiple EM flow table entries, each representing an instance (e.g., a specific address) corresponding to the subnet address parameter. If the flow entry is compatible and can be converted into an EM table entry, the method proceeds with a further determination and evaluation of additional criteria for selecting in which of the TCAM or EM table to program the wild card flow table entry.

In some embodiments, based on an evaluation of available space in the EM table, usage of the TCAM table, and at least one flow characteristic of the flow table entry, the TCAM or EM table is selected. These criteria are evaluated against a set of programmed rules to select in which table to program the entry. For example, if the usage of the TCAM exceeds a particular threshold and the available space in the EM table exceeds a different threshold, the EM table is selected. Other various rules, weighting, and analysis may be applied in selecting the table. If an EM table is selected, the wild card flow table entry is converted, if necessary, into one or more flow table entries compatible with the EM table and then programmed in the EM table.

To implement selection of an EM or TCAM table, an extensible operating system (EOS), a software defined network (SDN), and SDN APIs may be used to select and program flow tables. OpenFlow, for example, permits an operator to reprogram tables in TCAMs and other lookup tables utilizing commands from an SDN controller or from software installed on the respective network device. The OpenFlow API allows a user/operator to specify rules (e.g., forwarding rules) that are then implemented by applying the rules as entries in the tables.

The programming may include moving the processing of packet flows using entries with exact match parameters from a TCAM (e.g., utilizing one or more tables) to an exact match table. A controller/operator/device may program the switch to perform an EM lookup on these packets and bypass the TCAM lookups. After reprogramming, when network traffic passes into the switch(es), the switch will perform an exact match lookup of incoming packets and perform the associated action(s) if an exact match occurs.

In some approaches, an analysis of network traffic through a switch is performed and used to determine how the flows are allocated/reallocated between EM tables and TCAM tables. For example, packets that were previously processed using flow table entries in a TCAM (e.g., a typical OpenFlow flow) may be programmed/reprogrammed to use an exact match table if they contain parameters determined to be compatible with EM table programming. If determined to be compatible, further determinations of characteristics of the TCAM and EM tables and flow table entry are evaluated against a set of programmed rules.

In some embodiments, when the number of flow entries and/or tables that would be allocated to the TCAM reaches a particular threshold, the switch is (re)programmed to process one or more flow entries in an exact match table such as described above. This threshold may be based on when an additional flow entry in a TCAM would likely be less efficient than allocating the processing of the flow table entry in an EM table. Some or all of the determinations, evaluations, rules, and/or reprogramming may be performed by the switch (e.g., using an EOS) and/or a network controller connected to the switch.

Figure 1:
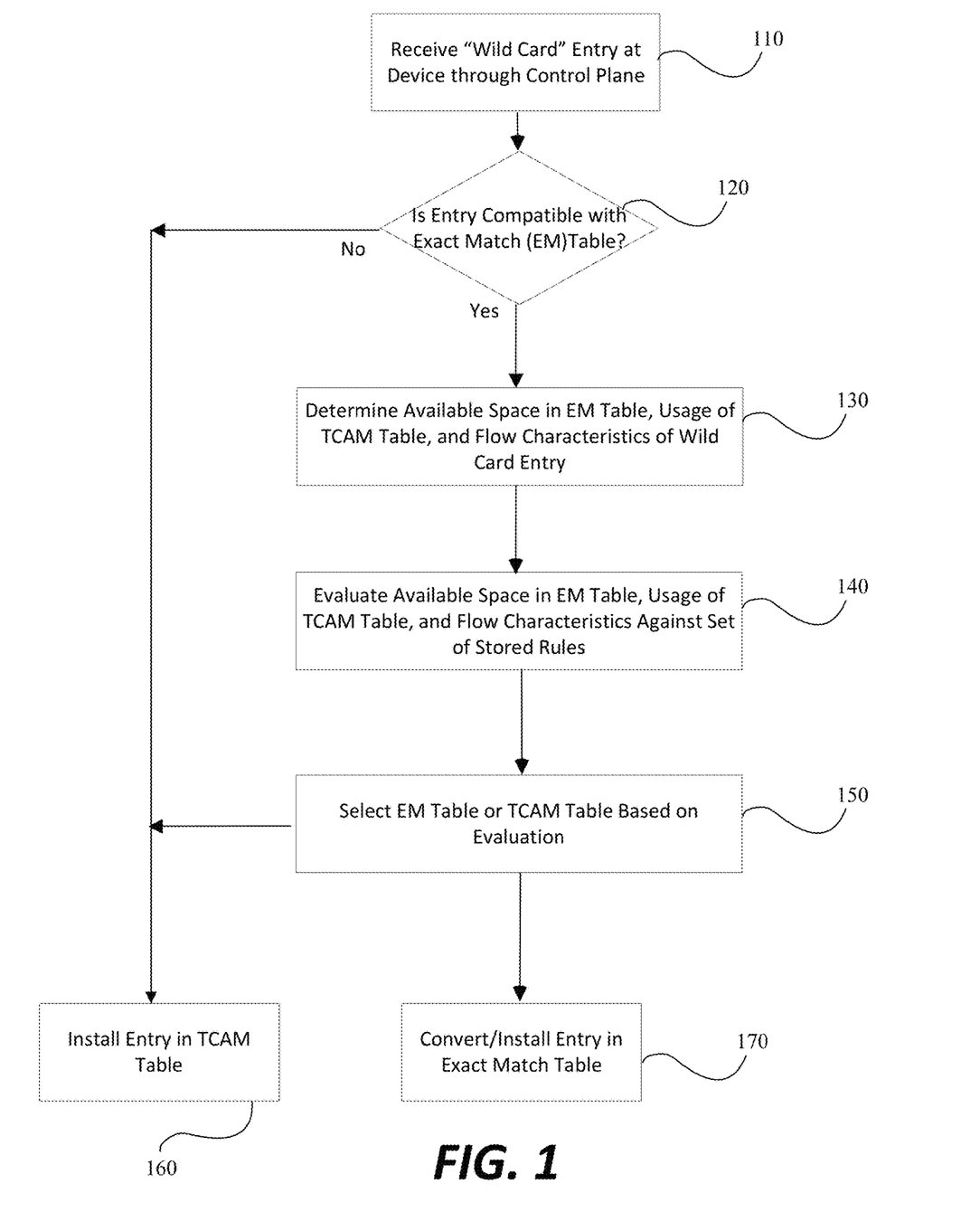
FIG. 1 is a flowchart of a process for selecting a flow table for programming a wild card entry, according to some embodiments.

FIG. 1 is a flowchart of a process for selecting a flow table for programming a wild card entry, according to some embodiments. At block 110, a wild card entry is received (e.g., from a network controller) at a network device (e.g., a switch). A wild card entry may include packet parameters for performing a lookup in a forwarding table and corresponding actions/permissions that should result from a match. In some embodiments, multiple entries may be grouped with each other to implement a particular forwarding or other network policy.

Figure 7:
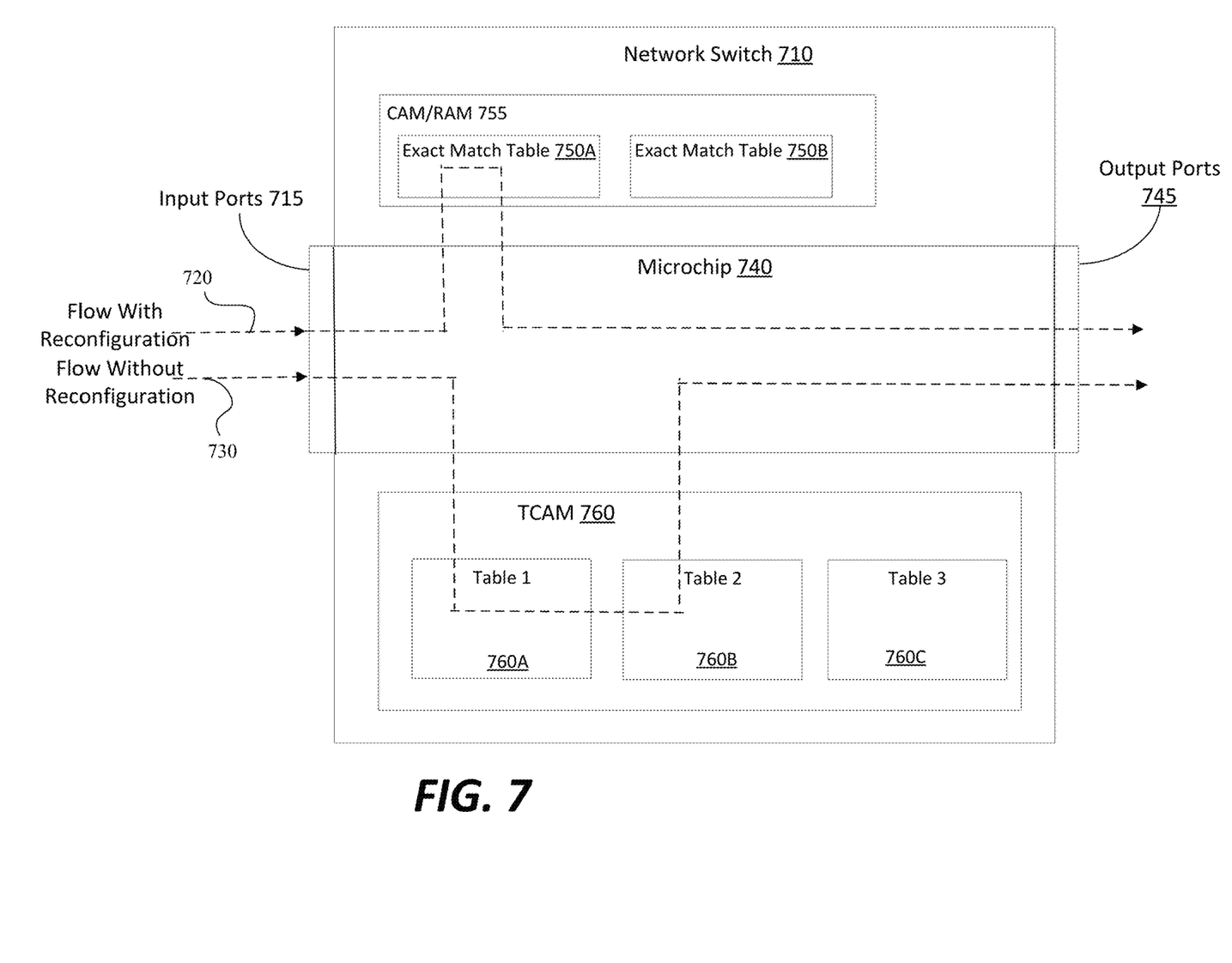
FIG. 7 is an illustrative block diagram of a network switch with TCAM and EM tables for processing wild card entries according to some embodiments.

At block 120, a determination is made of whether the wild card entry is compatible with an EM table (e.g., the EM table 750A of FIG. 7). Compatibility may be determined by analyzing whether the entry can be converted into one or multiple EM flow table entries. For example, it may be determined that a subnet address parameter of the entry can be processed using multiple EM flow table entries, each representing an instance (e.g., a specific address) corresponding to the subnet address parameter. If the entry is compatible and can be converted into an EM table entry, the method proceeds with determinations and evaluations at block 130 of additional criteria for selecting into which of the TCAM or EM table to program the entry.

At block 130, determinations of available space in the EM table, usage of the TCAM table, and at least one flow characteristic of the entry are made. The space available in an EM table may be determined such as by utilizing an EOS or SDN such as OpenFlow, for example. Usage of a TCAM table may be similarly determined. A determination of usage may include obtaining the amount of entries programmed in the TCAM and comparing this amount to the total capacity for entries in the TCAM. A determination of usage may also include a measure of traffic flow/processing through the TCAM.

A determined flow characteristic of the flow table entry may include the priority of the entry and/or of related flow table entries. For example, the flow table entry may be determined as a higher priority flow table entry that overrides a lower priority flow table entry currently programmed in the TCAM.

In an embodiment, a determination is made that the number of bits needed for programming the flow table entry in a TCAM exceeds a particular threshold. TCAMs may be configured with certain numbers of bits assigned for particular fields in logical table entries. The threshold may be based on an optimization of utilizing space in an EM table resource versus utilizing the valuable space used by these bits in the TCAM. Other relationships between the wild card flow table entry and flow table entries currently programmed in the TCAM and/or EM tables may also be determined. For example, the related flow table entries may be determined to represent a single flow.

At block 140, the determined available space in the EM table, usage of the TCAM table, and the at least one flow characteristic of the flow table entry are evaluated. These criteria are evaluated against a set of programmed rules to select into which table to program the entry. At block 150, a selection of the EM table or TCAM is made based on the evaluation and a set of stored programmed rules (e.g., in device 500 of FIG. 5 and switch 710 of FIG. 7).

An evaluation may include calculating if sufficient space in the EM table is available for programming the flow table entry and, if so, a rule selects the EM table if the flow table entry is a higher priority flow table entry that overrides a lower priority entry. That way, a series of multiple entries otherwise allocated in the TCAM may be processed more efficiently by an EM flow table entry or entries. Other various rules, weighting, and analysis may be applied in selecting the table.

At block 170, if an EM table is selected, the wild card flow table entry is converted, if necessary, into one or more flow table entries compatible with the EM table. For example, a wild card flow table entry with a subnet address may be translated/converted into multiple EM flow table entries (e.g., entries with specific addresses consistent with the subnet address). The converted/translated one or multiple flow table entries are then programmed in the EM table.

At block 160, if a TCAM is selected, the wild card entry is programmed in the TCAM. The TCAM may be selected, for example, if converting the entry would generate multiple flow table entries that would exceed a particular proportion of available space in the EM table.

Figure 2:
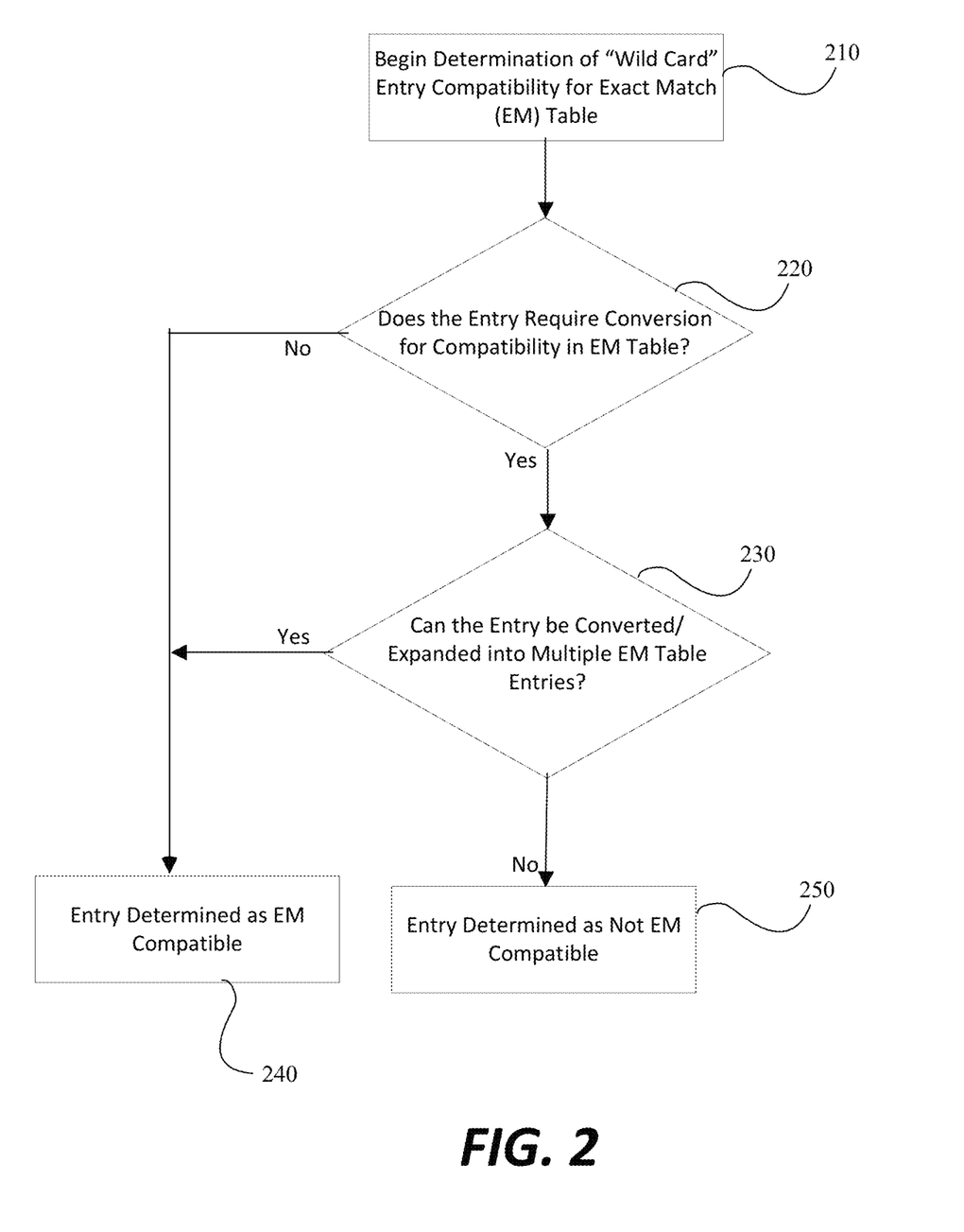
FIG. 2 is a flowchart of a process for determining the compatibility of a wild card entry for programming in an exact match (EM) table of a network device, according to some embodiments.

FIG. 2 is a flowchart of a process for determining the compatibility of a wild card entry for programming in an exact match table of a network device, according to some embodiments. At block 210, after a wild card entry is received (e.g., at a network switch 710 of FIG. 7), a process for determining the compatibility of the entry with an EM table (e.g., EM tables 750A or 750B) is started.

At block 220, a determination is made as to whether the entry requires conversion prior to programming in an EM table. For example, a field (e.g., subnet address) of the entry may not be consistent with a format (e.g., a complete address format) required by the EM table. The entry will thus need to be converted, if possible, before allocation into the EM table. In some embodiments, the wild card entry is compatible with the EM table and does not require conversion.

At block 230, if the wild card entry requires conversion to be programmed in the EM table, a further determination is made of whether the conversion can be performed. For example, it may be determined that a wild card entry with a subnet address can be translated/converted into multiple EM table entries (e.g., entries with specific addresses consistent with the subnet address).

At block 250, if the entry cannot be converted, a determination is made that the entry is not compatible with the EM table. At block 240, if the entry does not require conversion at block 220 or can be converted at block 230, the flow table entry is determined to be compatible with the EM table. After the entry is determined to be compatible with an EM table, further determinations and evaluations against a set of programmed rules may be performed such as described in reference to FIGS. 1 and 3.

Figure 3:
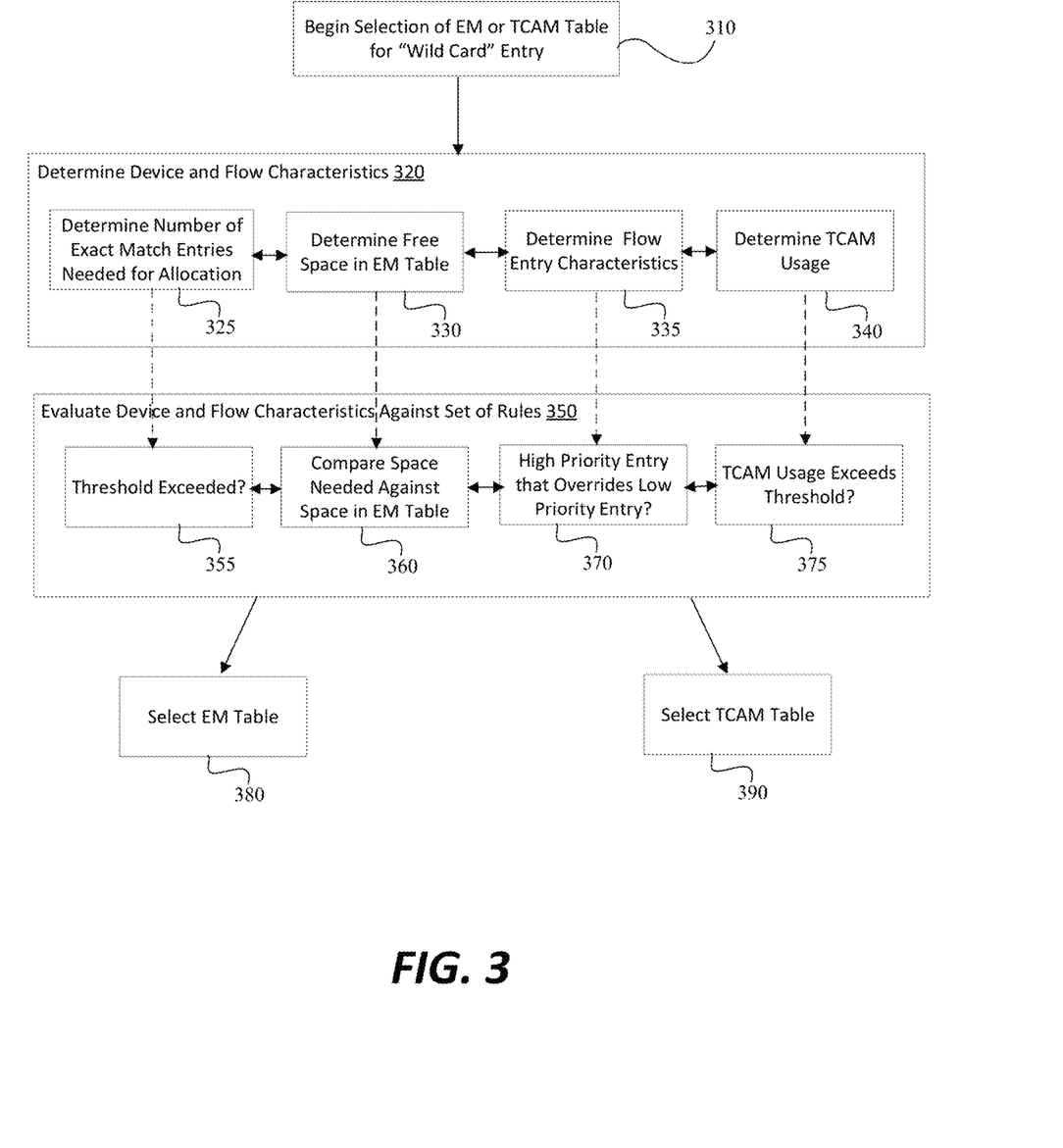
FIG. 3 is a flowchart of a process for analyzing a wild card entry for selection/allocation in an EM or ternary content addressable memory (TCAM) table, according to some embodiments.

FIG. 3 is a flowchart of a process for analyzing a wild card entry for selection/allocation in an EM or TCAM table of a network device, according to some embodiments. At block 310, after a wild card entry is received (e.g., at a network switch 710 of FIG. 7), a process is started for selecting a table for programming the flow table entry in an EM table or TCAM table (e.g., EM tables 750A or 750B or TCAM tables 760A, 760B, or 760C of network device 710 of FIG. 7).

At block 320, characteristics of the device (e.g., switch 710) and flow characteristics of the entry are determined. Determinations of device characteristics include determining available free space in EM tables at block 330 and TCAM table usage at block 340. The space available in an EM table may be determined such as by utilizing an EOS or SDN (e.g., OpenFlow). Usage of a TCAM table may be similarly determined with an EOS or SDN. A determination of usage may include obtaining the number of entries programmed in the TCAM and comparing this number to the total capacity for entries in the TCAM. A determination of TCAM usage may also include a measure of traffic flow/processing through the TCAM.

Further, the number of entries required to program the entry in an EM table is determined at block 325. The number of entries may be determined such as by calculating a number of exact match entries a wild card entry parameter (e.g., a masked subnet address) would need to be expanded into the EM table (e.g., the number of complete addresses needed to represent the subnet address).

At block 335, characteristics of the entry are determined. These characteristics may include the priority of the flow associated with the entry and/or characteristics of other entries connected with the flow. For example, the entry may be determined as a higher priority flow entry that overrides a lower priority flow entry currently programmed in the TCAM or being evaluated concurrently such as described in reference to FIG. 4.

At block 350, the determinations made at block 320 of the entry and network device characteristics are evaluated against a set of programmed rules. Evaluations may include analyzing, at block 355, whether the number of EM entries required to convert the wild card entry into multiple EM table entries exceeds a particular threshold. This threshold may be based on the free space available in the EM table determined at block 330. A rule may reflect that exceeding the threshold results in selecting the TCAM against selecting the EM table for allocation of the wild card entry.

At block 360, an evaluation includes weighing the available space in the EM against the TCAM usage determined at block 340. If the available space in the TCAM is above a particular threshold and space available in the EM table is below a particular threshold, for example, a rule may reflect selecting the TCAM table for allocating the wild card entry.

At block 370, an evaluation of entry characteristics is performed. A programmed rule may specify that high priority entries are to be allocated in a TCAM if the TCAM usage determined at block 340 falls below a particular threshold. Another rule may specify that a higher priority flow entry determined as overriding a lower priority entry at block 335 is to be programmed in an EM table if there is available space in the EM table for converting/allocating the wild card entry.

At block 375, an evaluation of TCAM usage may include evaluating whether the usage determined at block 340 exceeds a particular threshold and executing a programmed rule that selects the EM table for allocating the wild card flow entry if the threshold is exceeded. A rule may further be based on whether sufficient memory determined at block 330 is available in the EM table for a wild card entry in an (EM table) converted form.

At block 380, based upon the evaluation against a set of rules performed at block 350, an EM table is selected for allocating/programming the wild card entry. At block 390, a TCAM table is selected for allocating/programming the wild card entry. Other evaluations and rules than those described above may be performed for selecting the EM or TCAM tables at blocks 380 and 390.

Figure 4:
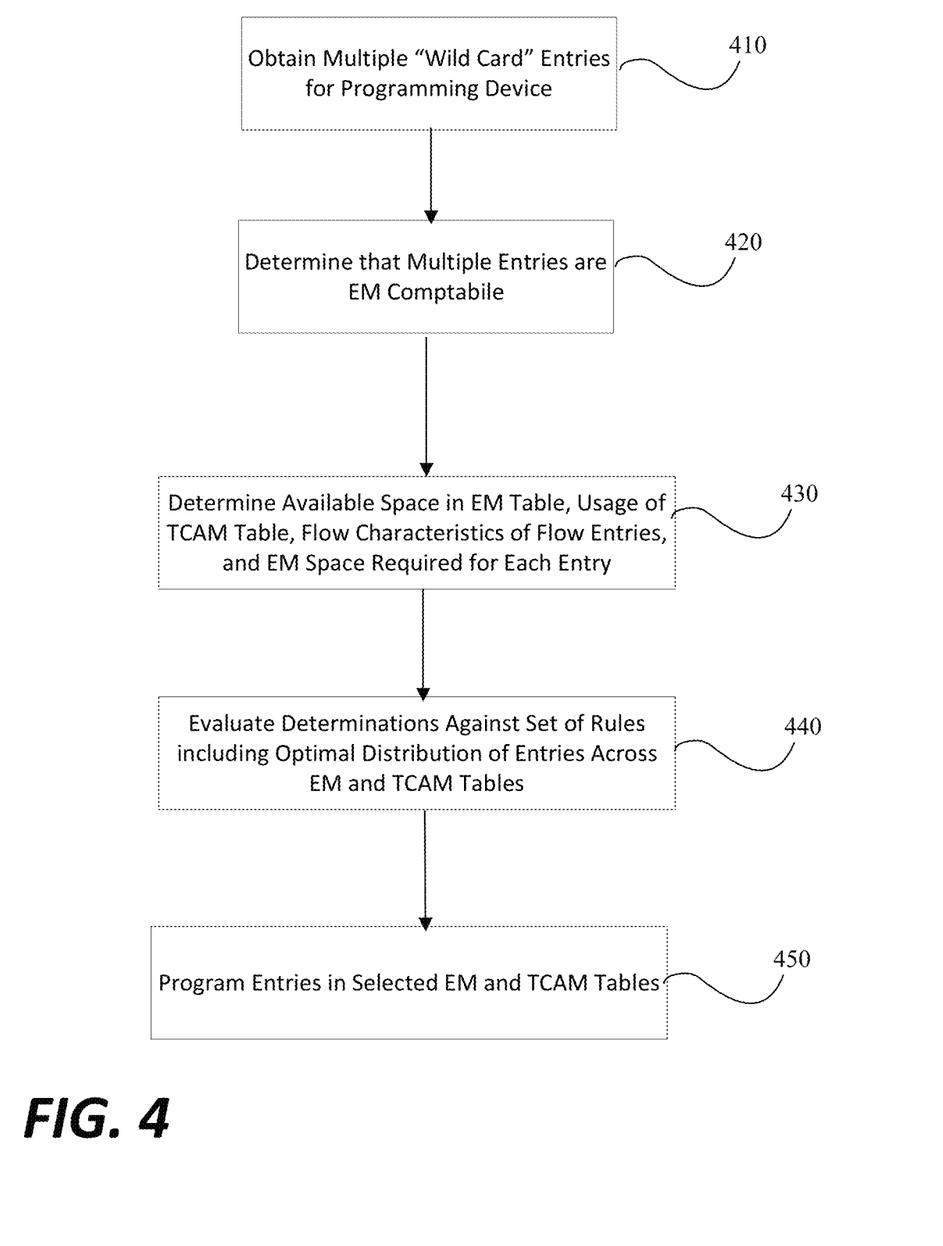
FIG. 4 is a flowchart of a process for selecting among multiple flow tables for programming multiple wild card entries, according to some embodiments.

FIG. 4 is a flowchart of a process for selecting among multiple tables for programming multiple wild card entries, according to some embodiments. At block 410, multiple wild card entries are received such as at network switch 710 of FIG. 7 or controller 682 of FIG. 6. Before allocating/programming the multiple entries, a determination is made at block 420 of whether each of the entries is compatible with an EM table (e.g., as described with respect to FIGS. 1-3). If none of the wild card flow entries is compatible, each of the entries is allocated/programmed in a TCAM table. If only one of the wild card entries is compatible, the remaining entries are allocated/programmed in a TCAM table while the compatible entry is further evaluated in view of programmed rules such described with respect to FIGS. 1-3.

At block 430, determinations of network device and flow characteristics of the table entries are performed. The determinations may be those described with respect to FIGS. 1-3, including the usage and available space of respective TCAM and EM tables among which the wild card entries are to be selected and programmed. The determinations include the amount of space required to program each of the entries in an EM table. The determinations also include determining flow characteristics of each flow pertaining to respective entries including, for example, the priorities of flows and relationships between the received entries and other entries already programmed in TCAM and/or EM tables.

At block 440, the determinations made at block 430 are evaluated at block 440 against a set of programmed rules for selecting a TCAM or EM table in which to program the received entries. An evaluation includes comparing the amount of EM table space needed for each of the wild card entries. A programmed rule may select the EM table for a wild card entry which needs fewer (converted) EM table entries than other wild card entries. Other optimization evaluations and rules may be used for allocating the multiple wild card flow entries among the TCAM and EM tables. At block 450, based on the evaluation(s) against a set of rules at block 440, TCAM and EM entries are selected and programmed with the multiple wild card entries.

Figure 5:
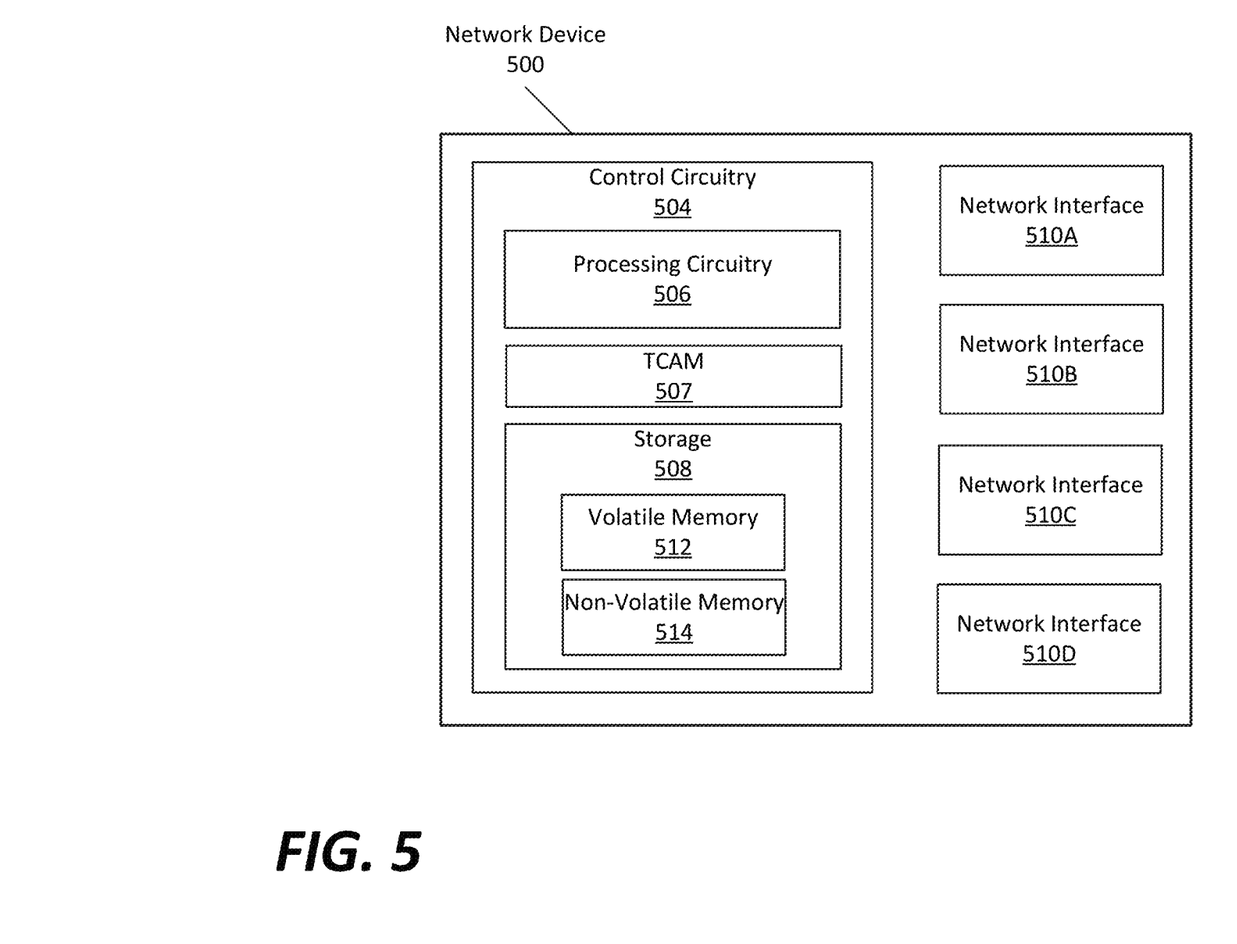
FIG. 5 shows a block diagram of a network device with an EM and TCAM table, according to some embodiments.

FIG. 5 shows a diagram of an illustrative network device 500 for processing network traffic, in accordance with some embodiments of the disclosure. Control circuitry 504 may be based on any suitable processing circuitry, such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor).

In some embodiments, the processing circuitry 506 is integrated with one or more on-chip TCAMs including multiple TCAM banks, which can decrease processing latency and decrease footprint compared to non-chip-integrated TCAMs. Examples include Arista Networks 7050 Series network switches. Exact match tables may be a component of separate memory, such as in volatile memory 512 of storage 508. Network interfaces 510A, 510B, 510C, and 510D may include input and output ports for receiving and transmitting network communications.

In some embodiments, control circuitry 504 executes instructions for performing operational, communication, and provisioning functions in devices such as described with respect to FIGS. 1-4. For example, control circuitry 504 may be used to select and program tables in TCAM 507 and exact match tables that may be located in storage 508 (in volatile RAM 512 and/or non-volatile RAM 514) and also process network traffic transmitted via network interfaces 510A . . . 510D and managed using the tables.

Storage 508 may be an electronic storage device that is part of control circuitry 504. As referred to herein, the phrase "electronic storage device" or "storage device" should be understood to mean any device for storing electronic data, computer software, instructions, and/or firmware, such as RAM, content-addressable memory (CAM), ternary content-addressable memory (TCAM), hard drives, optical drives, solid state devices, quantum storage devices, or any other suitable fixed or removable storage devices, and/or any combination of the same. The circuitry described herein may execute instructions included in software running on one or more general purpose or specialized processors. Multiple circuits may be provided to handle simultaneous processing functions. Further, other devices described herein may include the processing and storage components of device 500 and/or variations thereof.

Figure 6:
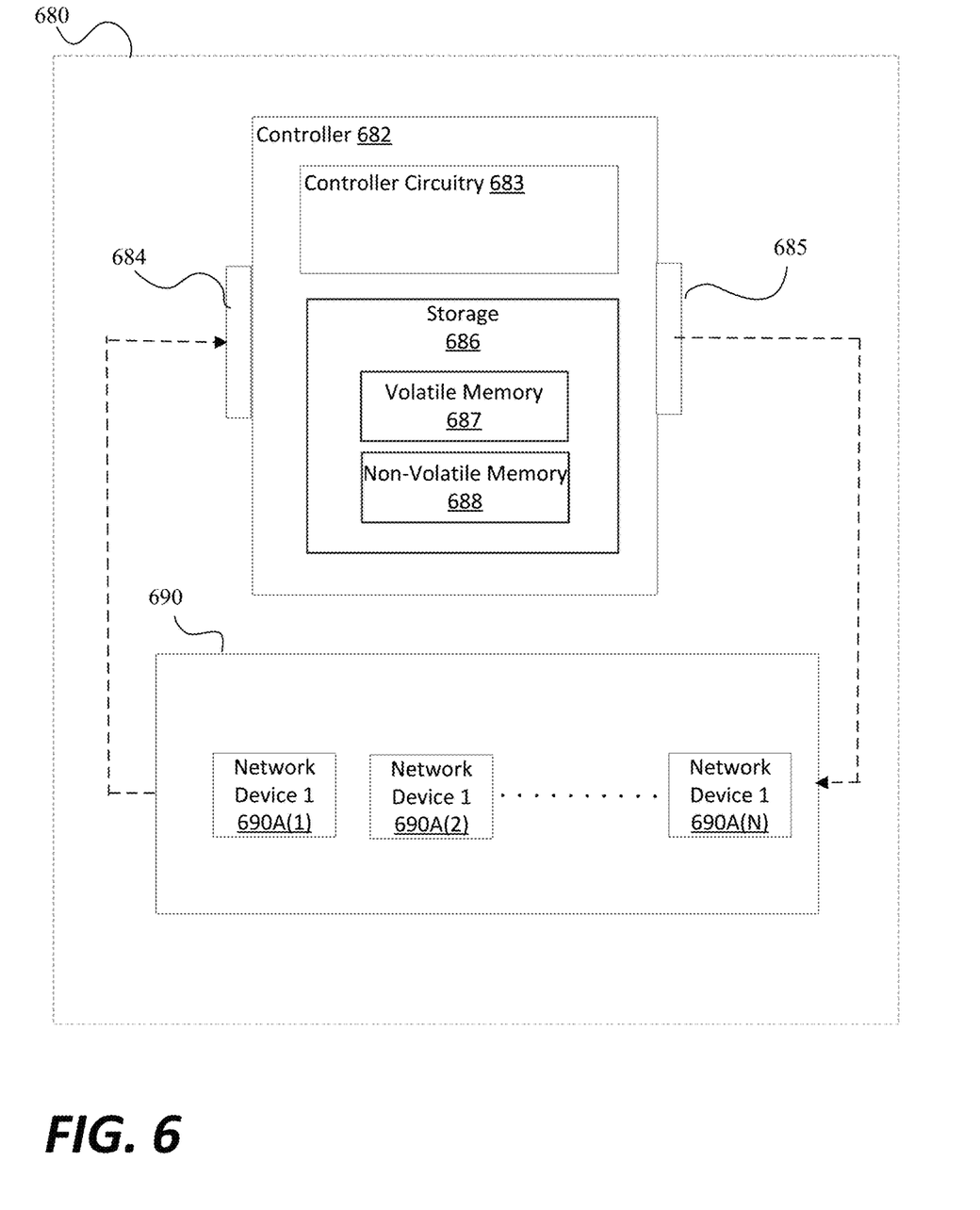
FIG. 6 is an illustrative block diagram of a network controller and multiple network devices for processing network traffic, according to some embodiments.

FIG. 6 is an illustrative block diagram of a network controller and multiple network devices for processing network traffic, according to some embodiments. A network 680 includes a group 690 of devices 690A(1), 690A(2) . . . 690A(N) that are connected to a network controller 682. Network controller 682 receives network data at input ports 684 such as via a test access point (TAP). The network data may be stored in storage 686 in either volatile memory 687 or non-volatile memory 688. Control circuitry 683 of controller 682 and/or devices 690A(1) . . . 690A(N) may determine characteristics of devices 690A(1) . . . 690A(N) and flow characteristics of flow table entries to be programmed in these devices. Based on the determinations, further evaluation and selection among the TCAM and EM tables are performed. Along with embodiments described in reference to FIGS. 1, 2, and 4, determinations and evaluation may include measuring and evaluating levels of network traffic, determining the destinations of the traffic, and executing rules that optimize assignment of flow table entries between EM and TCAM tables of particular devices. For example, an evaluation of network traffic pertaining to a particular wild card flow table entry or entries that indicates low usage may result in (re)selecting an EM table over a TCAM table in which to program the wild card entry or entries.

After performing determinations and/or evaluations against programmed rules, control circuitry 683 may cause configuration instructions to be transmitted out of output ports 685 to one or more of devices 690A(1), 690A(2) . . . 690A(N). The instructions may configure the flow tables of switches, routers, or other network devices as described herein. In some embodiments, the instructions are generated via an SDN (e.g., OpenFlow instructions), using software (e.g., an EOS) installed on controller 682 and/or on the respective devices 690A(1), 690A(2), . . . 690A(N), or by an operator from a terminal. Controller 682 may further analyze subsequent network traffic after transmitting instructions and in order to analyze the effects of the instructions. In some embodiments, machine learning is utilized to determine how to optimize the assignment of flow table entries among tables of the group 690 of devices in a feedback training mechanism.

FIG. 7 is an illustrative block diagram of a network switch with TCAM and exact match tables for processing flow table entries according to some embodiments. A network switch 710 includes a TCAM 760 with tables 760A, 760B, and 760C and a CAM/RAM memory 755 including exact match tables 750A and 750B. A first flow of packets 720 and a second flow of packets 730 are received at input ports 715 of a processing unit 740 (e.g., a microchip) of network switch 710 and exit an output port 745. The first flow of packets 720 represent processing of packets utilizing programming in TCAM tables 760A, 760B, and 760C. The second flow of packets 730 represent processing of the same packets if the programming for the first flow was allocated in exact match table 750A.

A flow 720, configured or originally arranged to be processed according to flow 730 with wild card entries in a TCAM table 760A and 760B, is implemented with an exact match entry. The entries of tables 760A and 760B are wild card entries designed for TCAM 760. A determination is made that the wild card entries determined are compatible with exact match table 750(A) (e.g., as described in reference to FIGS. 1, 2, and 4). In response to determining that the entries are compatible with EM table 750A, the determined characteristics of TCAM 760, EM tables 750A, and the wild card entries are evaluated against a set of programmed rules such as further described herein. Based upon the evaluation against the set of rules, EM table 750A is selected for allocating/converting the entries of flow 730 into EM table entries in EM table 750A. Flow 730 is then processed as flow 720 using EM table 750A.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for programming a network device, the method comprising:
   receiving a wild card entry at a network device, the network device comprising a ternary content addressable memory (TCAM) table and an exact match (EM) table;
   determining whether the wild card entry is compatible with the EM table;
   in response to determining that the wild card entry is compatible with the EM table:
   determining available space in the EM table;
   determining usage of the TCAM table;
   determining at least one flow characteristic of the wild card entry;
   evaluating the determined available space in the EM table, usage of the TCAM table, and the at least one flow characteristic against a set of stored rules that select the EM table or the TCAM table for programming the wild card entry; and
   programming the wild card entry in the EM table or TCAM table based upon the selection.

2. The method of claim 1 wherein the set of stored rules comprises selecting the EM table based upon determining that the TCAM table usage exceeds a predetermined amount and that the available space in the EM table exceeds a predetermined amount.

3. The method of claim 1 wherein the set of stored rules comprises selecting the EM table based upon a flow characteristic that comprises a designation as a higher priority flow of a lower priority flow table entry already programmed in the TCAM table.

4. The method of claim 1 wherein the set of stored rules comprises selecting the EM table based upon determining that the memory space needed for expanding the wild card entry into multiple entries in the EM table does not exceed the determined available memory space in the EM table.

5. The method of claim 1 wherein the set of stored rules comprises selecting the EM table for programming a first wild card entry and selecting the TCAM table for programming a second wild card entry based upon an optimal table allocation between the first and second wild card entries;
   wherein the wild card entry received at the network device is the first wild card entry, the network device further receives the second wild card entry, and wherein the method further comprises:
   determining that a memory space needed for programming both the first and second wild card entries in the EM table exceeds the available space in the EM table; and
   determining that programming the first wild card entry in the EM table is optimal over programming the second wild card entry in the EM table.

6. The method of claim 1 further comprising:
   in response to determining that the wild card entry is not compatible with the EM table, programming the wild card entry in the TCAM table.

7. The method of claim 1 wherein determining compatibility with the EM table comprises determining that the wild card entry can be expanded into multiple exact match entries in the EM table.

8. The method of claim 1 wherein programming the wild card entry in the EM table comprises converting the wild card entry into multiple EM flow entries.

9. The method of claim 8 wherein the wild card entry comprises a subnet address parameter and the converting the wild card entry comprises generating multiple EM entries each including an EM address parameter corresponding to the subnet address.

10. The method of claim 1 wherein the wild card entry is identified as a wild card entry by detecting a mask in association with a parameter of the wild card entry.

11. The method of claim 1 wherein the wild card entry is received from a network controller utilizing a software defined networking (SDN) protocol.

12. A system for processing network communications, the system comprising:
    one or more network devices programmed and configured to cause one or more processors to perform:
    receiving a wild card entry at a network device, the network device comprising a content addressable memory (TCAM) table and an exact match (EM) table;
    determining whether the wild card entry is compatible with the EM table;
    in response to determining that the wild card entry is compatible with the EM table:
    determining available space in the EM table;
    determining usage of the TCAM table;
    determining at least one flow characteristic of the wild card entry;
    evaluating the determined available space in the EM table, usage of the TCAM table, and the at least one flow characteristic against a set of stored rules that select the EM table or the TCAM table for programming the wild card entry; and
    programming the wild card entry in the EM table or TCAM table based upon the selection.

13. The system of claim 12 wherein the set of stored rules comprises selecting the EM table based upon determining that both the TCAM table usage exceeds a predetermined amount and that the available space in the EM table exceeds a predetermined amount.

14. The system of claim 12 wherein the set of stored rules comprises selecting the EM table based upon a flow characteristic that comprises a designation as a higher priority flow of a lower priority flow table entry already programmed in the TCAM table.

15. The system of claim 12 wherein the set of stored rules comprises selecting the EM table based upon determining that the memory space needed for expanding the wild card entry into multiple entries in the EM table does not exceed the determined available memory space in the EM table.

16. The system of claim 12 wherein the set of stored rules comprises selecting the EM table for programming a first wild card entry and selecting the TCAM table for programming a second wild card entry based upon an optimal table allocation between the first and second wild card entries;

wherein the wild card flow table entry received at the network device is the first wild card entry, the network device further receives the second wild card entry and, in response to determining that the wild card entry is compatible with the EM table, the one or more network devices are programmed and configured to cause the one or more processors to perform:

determining that a memory space needed for programming both the first and second wild card entries in the EM table exceeds the available space in the EM table; and determining that programming the first wild card entry in the EM table is optimal over programming the second wild card entry in the EM table.

17. The system of claim 12 wherein, in response to determining that the wild card entry is not compatible with the EM table, the one or more network devices are programmed and configured to cause the one or more processors to perform:

programming the wild card entry in the TCAM table.

18. The system of claim 12 wherein determining compatibility with the EM table comprises determining that the wild card entry can be expanded into multiple exact match entries in the EM table.

19. The system of claim 12 wherein programming the wild card entry in the EM table comprises converting the wild card entry into multiple EM flow entries.

20. The system of claim 19 wherein the wild card entry comprises a subnet address parameter and the converting the wild card entry comprises generating multiple EM entries each including an EM address parameter corresponding to the subnet address.

21. The system of claim 12 wherein the wild card entry is identified as a wild card entry by detecting a mask in association with a parameter of the wild card entry.

22. The system of claim 12 wherein the wild card entry is received from a network controller utilizing a software defined networking (SDN) protocol.

* * * * *